United States Patent
Wu

(10) Patent No.: US 11,557,925 B2
(45) Date of Patent: Jan. 17, 2023

(54) WIRELESS CHARGING POSITIONING DEVICE AND METHOD, AND STORAGE MEDIUM

(71) Applicant: BEIJING XIAOMI MOBILE SOFTWARE CO., LTD., Beijing (CN)

(72) Inventor: Pengfei Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 103 days.

(21) Appl. No.: 17/023,146

(22) Filed: Sep. 16, 2020

(65) Prior Publication Data

US 2021/0336490 A1 Oct. 28, 2021

(30) Foreign Application Priority Data

Apr. 24, 2020 (CN) .......................... 202010332949.7

(51) Int. Cl.
| | | |
|---|---|---|
| H02J 50/40 | (2016.01) | |
| H02J 50/90 | (2016.01) | |
| H02J 50/12 | (2016.01) | |
| H01F 27/29 | (2006.01) | |

(52) U.S. Cl.
CPC .......... *H02J 50/402* (2020.01); *H01F 27/292* (2013.01); *H02J 50/12* (2016.02); *H02J 50/90* (2016.02)

(58) Field of Classification Search
None
See application file for complete search history.

(56) References Cited

U.S. PATENT DOCUMENTS

| | | |
|---|---|---|
| 2010/0259217 A1 | 10/2010 | Baarman et al. |
| 2013/0119773 A1 | 5/2013 | Davis |
| 2015/0364929 A1 | 12/2015 | Davis |
| 2016/0134154 A1 | 5/2016 | Baarman et al. |
| 2016/0190851 A1 | 6/2016 | Pudipeddi et al. |
| 2019/0103771 A1* | 4/2019 | Piasecki ............... H04B 5/0037 |
| 2019/0190324 A1 | 6/2019 | Bossetti et al. |

(Continued)

FOREIGN PATENT DOCUMENTS

| | | |
|---|---|---|
| WO | 2016014294 A1 | 1/2016 |
| WO | 2018057656 A1 | 3/2018 |

OTHER PUBLICATIONS

Extended European Search Report in the European Application No. 20198698.1, dated Mar. 12, 2021, (7p).

(Continued)

*Primary Examiner* — Daniel Kessie
(74) *Attorney, Agent, or Firm* — Arch & Lake LLP

(57) ABSTRACT

A wireless charging positioning device and method, a receiver and a storage medium are provided. The device is applied to a transmitter and includes: at least one group of detection coils and at least one processor. Each group of detection coils includes N detection coils, detection regions covered by different detection coils are at least partially different, detection coil is configured to transmit a detection signal and receive a feedback signal sent by a receiver, and N is a positive integer greater than or equal to 2. The at least one processor is connected with the N detection coils and configured to determine a position region of the receiver at the transmitter according to the feedback signals received by the N detection coils.

17 Claims, 9 Drawing Sheets

(56) References Cited

U.S. PATENT DOCUMENTS

| | | |
|---|---|---|
| 2019/0267828 A1 | 8/2019 | Goodchild et al. |
| 2019/0386512 A1 | 12/2019 | Xiong |
| 2020/0057474 A1* | 2/2020 | Pabbisetty ............ G06F 1/1635 |
| 2020/0136436 A1 | 4/2020 | Goodchild et al. |
| 2020/0203995 A1* | 6/2020 | Osada .................... H02J 50/12 |

OTHER PUBLICATIONS

First Office Action of the European Application No. 20198698.1, dated Mar. 2, 2022, (4p).

* cited by examiner

WIRELESS CHARGING POSITIONING DEVICE AND METHOD, AND STORAGE MEDIUM

CROSS-REFERENCE TO RELATED APPLICATIONS

This application is based upon and claims priority to Chinese Patent Application No. 202010332949.7, filed on Apr. 24, 2020, the entire content of which is incorporated herein by reference for all purposes.

TECHNICAL FIELD

The present disclosure generally relates to the technical field of wireless charging, and more particularly, to a wireless charging positioning device and method, and a storage medium.

BACKGROUND

Along with the development of charging technologies, more and more terminals are capable to be charged in a wireless charging manner. Under a normal condition, a user places a terminal (i.e., a receiver) on a wireless charging base (i.e., a transmitter) for wireless charging. However, since alignment positions of the receiver and the transmitter are deviated during wireless charging, for example, the receiver is not placed in a transmitting coil of the transmitter, an electromagnetic wave signal and other signals for wireless charging are not completely utilized by the receiver, thereby resulting in low charging efficiency, serious energy loss, and the like.

In a related art, a receiver is usually positioned by observation through eyes, thereby determining whether the receiver is deviated. However, such a positioning manner for the receiver is usually low in accuracy and intelligence. Therefore, how to position a receiver on the wireless charging base (transmitter) automatically and accurately becomes a technical problem urgent to be solved.

SUMMARY

According to a first aspect of the present disclosure, a wireless charging positioning device is provided, which may be applied to a transmitter and may include: a group of detection coils including N detection coils, detection regions covered by different detection coils being at least partially different, the detection coil being configured to transmit a detection signal and receive a feedback signal sent by a receiver, and N being a positive integer greater than or equal to 2; and at least one processor, connected with the N detection coils and configured to determine a position region of the receiver at the transmitter according to the feedback signals received by the N detection coils.

According to a second aspect of the present disclosure, a wireless charging positioning method is provided, which may be applied to a transmitter and include that: by use of at least one group of detection coils prearranged in the transmitter, detection signals are transmitted and feedback signals sent by a receiver are received, the at least one group of detection coils including N detection coils, N being a positive integer greater than or equal to 2, and detection regions covered by different detection coils being at least partially different; and a position region of the receiver at the transmitter is determined according to the feedback signals received by the N detection coils.

According to a third aspect of the present disclosure, a receiver is provided, which may include: a processor; and a memory configured to store instructions executable by the processor. The processor may be configured to execute the steps of any abovementioned method.

According to a fourth aspect of the present disclosure, a non-transitory computer-readable storage medium is provided, in which a computer program may be stored, the program being executed by a processor to implement the steps of any abovementioned method.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1A:
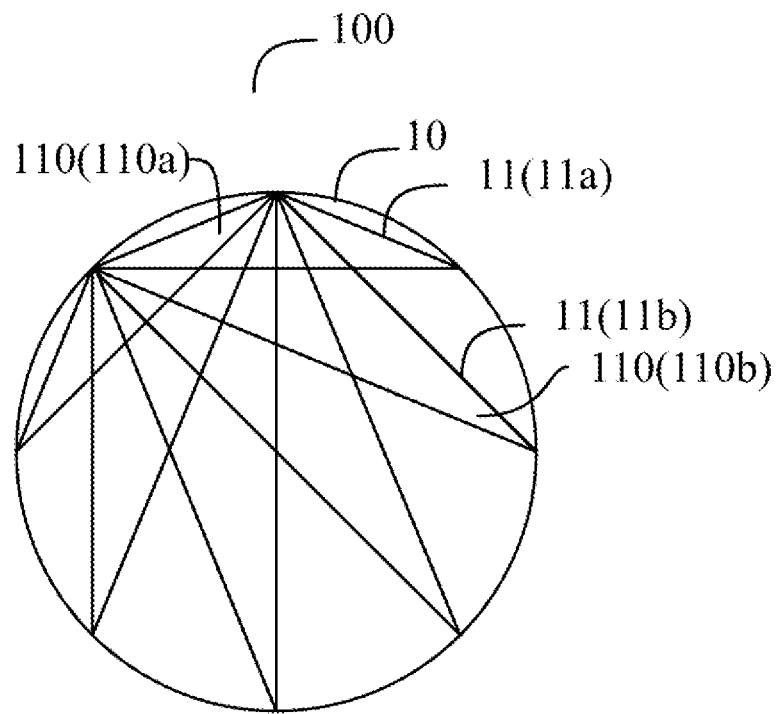
FIGS. 1A-1B are respectively a structure diagram of a wireless charging positioning device, according to an example.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are for describing particular embodiments only, and are not intended to limit the present disclosure. The singular forms "a/an", "the" and "this" used in the present disclosure and the appended claims are also intended to include the plural forms unless the context clearly indicates other meanings. It is to be understood that the term "and/or" as used herein refers to and includes any or all possible combinations of one or more associated listed items.

It is to be understood that although the terms first, second, third, etc. may be used to describe various information in the present disclosure, the information should not be limited to these terms. The terms are only used to distinguish the same type of information from each other. For example, without departing from the scope of the present disclosure, the first information may also be referred to as second information, and similarly, the second information may also be referred to as first information. Depending on the context, the word "if" as used herein may be interpreted as "during" or "when" or "in response to determining."

In the technical field of wireless charging, a transmitter for wireless charging and a receiver for wireless charging are included. An electromagnetic induction principle is mainly adopted for a wireless charging technology. After an alternating current is applied to a charging coil of the transmitter, the charging coil generates a magnetic field, and then a current is generated by the magnetic field. Herein, the transmitter refers to an end configured to transmit electromagnetic energy and providing the current through the charging coil, and usually includes a wireless charger; and the receiver refers to an end configured to receive the electromagnetic energy, and usually includes a charged mobile phone, tablet computer or wearable device, etc. It can be seen that, since the transmitter externally transmits the magnetic field by use of the charging coil during wireless charging, if an overlap ratio of the charging coil and the receiver is higher, it is indicated that the charging coil is aligned with the receiver better, the energy loss of the transmitter is lower and the charging efficiency is higher. Therefore, if a position where the receiver is placed at present may be determined accurately, a relative position relationship of the receiver and a transmitting coil may be determined at least, and relative positions may be timely adjusted to reduce the energy loss and improve the charging efficiency.

Figure 1B:
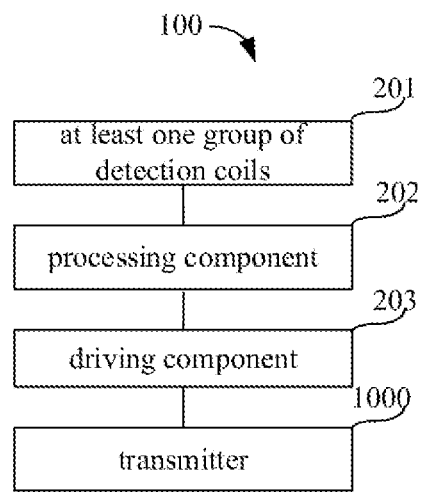

Based on this, FIGS. 1A-1B are respectively a structure diagram of a wireless charging positioning device, according to an example. As illustrated in FIGS. 1A and 1B, a wireless charging positioning device 100 is applied to a transmitter 1000 and includes: at least one group of detection coils 201 and a processing component 202. Each group of detection coils may include N detection coils 11, detection regions 110 covered by different detection coils 11 may be at least partially different, and each detection coil 11 may be configured to transmit a detection signal and receive a feedback signal transmitted by a receiver. N may be a positive integer greater than or equal to 2. The processing component 202 may be connected with the N detection coils 11 and configured to determine a position region of the receiver at the transmitter 1000 according to the feedback signals received by the N detection coils 11.

Herein, the transmitter 1000 may be a wireless charger. It is to be supplemented that the transmitter may also be a terminal device, and the terminal device is adopted for reverse wireless charging. Herein, the terminal device may be a mobile terminal or a fixed terminal. The mobile terminal may be a mobile phone, a tablet computer, a notebook computer, a wearable device, or the like. The fixed terminal may be a desktop computer, a smart television, or the like. In fact, any device capable of wirelessly charging another device should be considered as the transmitter 1000 in the embodiments.

Herein, the receiver may also include a mobile terminal or fixed terminal with an energy consumption requirement and capable of receiving electric energy for wireless charging.

Herein, the detection coil 11 may be a closed coil. After the detection coil is energized, electromagnetic energy may be externally emitted and thus may be received by an opposite end in the detection region 110 covered by the detection coil 11, and a corresponding feedback is given.

Herein, the detection coil 11 is different from a transmitting coil (or called charging coil) of the transmitter. The transmitting coil may be configured to transmit a wireless charging signal to provide wireless electric energy for the receiver.

In some embodiments, the detection coil and the transmitting coil are on the same horizontal plane. That is, both the detection coil and the transmitting coil are arranged on a circuit board on the same horizontal plane. Therefore, the overall thickness of the transmitter may be reduced.

However, in the embodiment, after the position region of the receiver is determined, if a position of the transmitting coil is required to be adjusted, the detection coil may also move with it. Therefore, under this condition, it may also be necessary to check the position region of the receiver after the position of the transmitting coil is adjusted. Therefore, for reducing the number of detection times, in some other embodiments, the detection coil and the transmitting coil are on different horizontal planes. In such case, the detection coil and the transmitting coil may be separated, the position of the transmitting coil is automatically adjusted according to the determined position region after the detection coil detects the position region of the receiver, and in an adjustment process, it is unnecessary to recheck the position region of the receiver.

In addition, an area of the regions covered by the N detection coils is larger than an area of a region covered by the transmitting coil, such that the detection coil can detect whether the receiver is placed in a region uncovered by the transmitting coil.

Herein, the processing component is usually configured to control overall operations of the transmitter, such as operations associated with data communications or data recording. The processing component may include one or more processors for executing instructions to complete the corresponding operations. Herein, the processing component may be configured to determine the position region of the receiver, or may record the position region of the receiver.

In some implementations, the processing component may include a central processing unit (CPU) of the transmitter. For example, the processing component may include an application processor (AP). It can be understood that an operating system, user interface and application program of the transmitter are mostly executed in the AP.

It can be understood that, if the receiver is in the detection region 110 covered by a presently energized detection coil 11, the detection coil 11 may receive a feedback signal of the receiver. If the receiver is not placed in the detection region 110 covered by the presently energized detection coil 11 but a feedback signal is received, the feedback signal received in such case may apparently be different from the feedback signal received when the receiver is placed in the detection region. Therefore, in the embodiment, the position region of the receiver may be determined through the detection signal transmitted by the detection coil 11 and a receiving result of the received feedback signal, so as to implement automatic positioning of the position region of the receiver.

It can be understood that receiving results of the feedback signals received by the N different detection coils are utilized, and the detection regions covered by different detection coils are at least partially different, which means that the detection regions covered by different detection coils may at least cover different regions of the transmitter, such that multiple different regions on a surface of the transmitter may be covered as much as possible, and different detection regions may be detected to obtain different receiving results, so as to detect whether the receiver exists in these different regions and then automatically determine the position region of the receiver.

It is to be supplemented that the transmitter usually includes a base configured to bear the charged end or the receiver, such that the receiver may be placed on the base for charging. For example, referring to FIG. 1A, the transmitter 1000 includes a base 10. Herein, the base 10 may be round and may also be square, and the shape is not limited.

As an optional embodiment, the N detection coils 11 are in a preset range of the base 10 of the transmitter.

In some embodiments, the N detection coils may be in a preset distance above the base 10 of the transmitter. Of course, in some other embodiments, the N detection coils may also be in a preset distance below the base 10 of the transmitter. In a word, the N detection coils may be configured to detect the position region of the receiver placed on the base 10.

Here, the detection regions covered by the N detection coils 11 are, for example, below a surface of the base 10 respectively. The detection regions covered by the N detection coils 11 are in completely different regions below the surface of the base 10 respectively. Therefore, the position region of the receiver in different regions on the surface of the base may be detected.

However, it is to be understood that, since the detection regions covered by the N detection coils are completely different regions, in some embodiments, there may be a gap between two adjacent detection coils and, if the receiver is in a space where the gap between two adjacent detection coils is located, the receiver may not be detected accurately and the receiver may not be positioned. For reducing gaps between the detection coils as much as possible and reducing the condition that the receiver is placed in a space where the gap between two adjacent detection coils is located and may not be detected, in some other embodiments, at least two detection coils are partially stacked, namely the detection regions covered by two detection coils are partially the same and partially different.

In some embodiments, referring to FIG. 1A, for distinguishing different detection coils 11 better, at least two detection coils of the N detection coils may include a first detection coil 11a and a second detection coil 11b as illustrated in FIG. 1A. The first detection coil 11a covers a first detection region 110a, and the second detection coil 11b covers a second detection region 110b. It can be understood that partial stacking of the first detection coil 11a and the second detection coil 11b refers to that part of segments in coils of the first detection coil 11a and the second detection coil 11b are placed at the same position or close positions. In such a manner, the first detection region 110a and the second detection region 110b may partially overlap, such that the gap between the two detection regions is reduced, and the condition that the receiver is placed in the space where the two adjacent detection coils is located and may not be detected accurately may further be reduced.

The N detection coils may be detection coils in the same shape and with the same specification parameter. Herein, the specification parameter includes a length, width or height, or the like of the shape enclosed by the detection coil, and may also include a material or cross sectional area, or the like of the detection coil. Therefore, the detection coils may be conveniently manufactured when multiple detection coils are laid.

Herein, the shape of the detection coil may be a shape adapted to the receiver or a projection shape of the receiver. For example, if the receiver is a rectangular mobile phone, the detection coil may be laid in a shape the same as the shape of the receiver or the projection shape of the receiver.

In some other embodiments, the N detection coils may be in different shapes and may also have different specification parameters. For example, the N detection coils may be rectangular, triangular, round, or the like. Therefore, applicability to detection of receivers in different shapes and receivers in different sizes may be ensured.

In a specific embodiment, the detection coil is a polygon, and a stacked part of the at least two detection coils is one or more sides of the polygon.

Referring to FIG. 1A, herein, the polygon may be a triangle, and the stacked part of the at least two detection coils includes one side or edge of the triangle. Of course, in another embodiment, the polygon may also be a quadrangle, a pentagon, or the like. Here, the side or edge of the triangle may include an area instead of just a line section.

It is to be supplemented that one detection result may be obtained through one group of detection coils. In the embodiment, the at least one group of detection coils is arranged, such that at least one detection result may be obtained; and then the at least one detection result may be comprehensively considered and analyzed to obtain a more accurate position region of the receiver. Therefore, the accuracy of the finally detected position region of the receiver may be improved. During a practical application, if the group number of detection coils is larger, the accuracy of the obtained position region of the receiver is higher.

In some embodiments, the detection coils are partially stacked. Therefore, in these embodiments, the detection coils may be grouped in a manner that the stacked detection coils are determined as a group of detection coils.

In some embodiments, for the condition that the detection coil is a polygon and the stacked part of the at least two detection coils is one or more sides of the polygon, the one or more sides of the polygon, i.e., the stacked part of the at least two detection coils, may be determined as reference sides, and the detection coils with the reference sides are divided into the same group.

Figure 2:
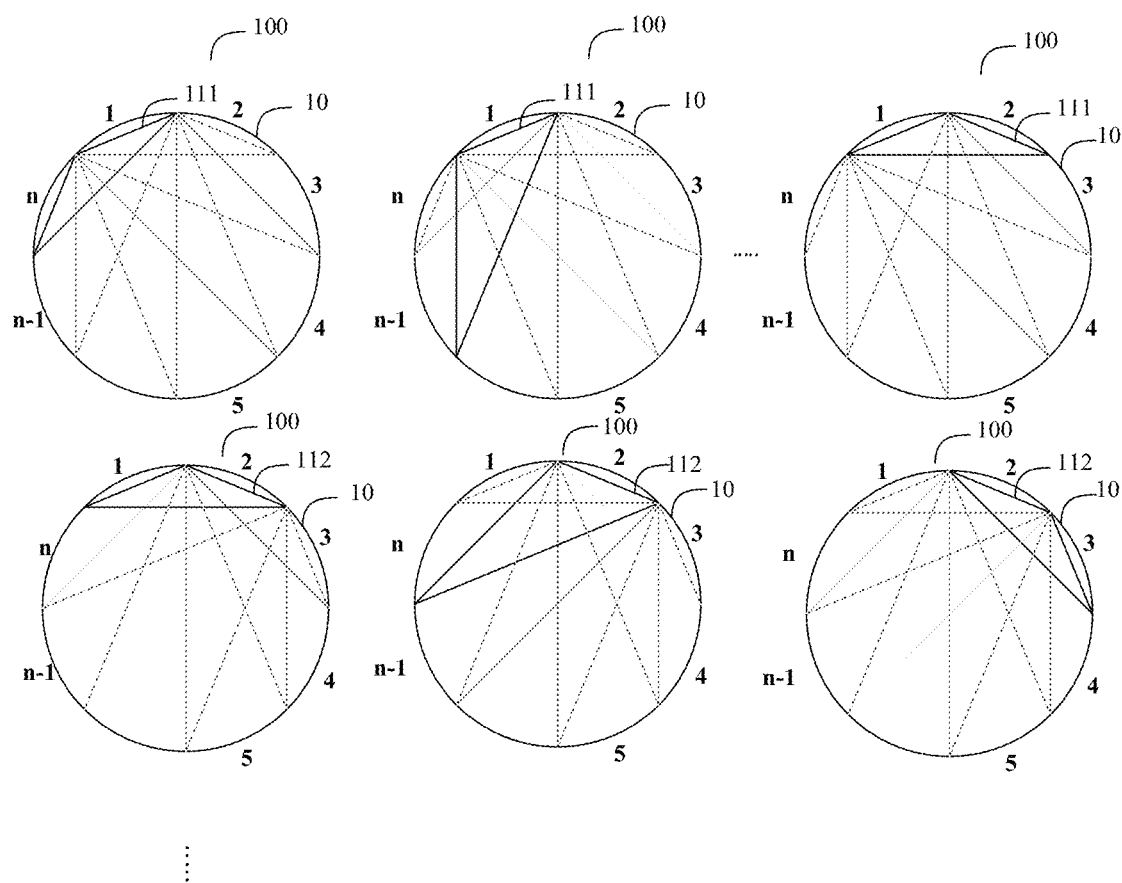
FIG. 2 is a group structure diagram of a wireless charging positioning device, according to an example.

In some embodiments, referring to FIG. 2, FIG. 2 is a group structure diagram of a wireless charging positioning device, according to an example. As illustrated in FIG. 2, n detection coils in each group of detection coils are stacked on one side.

For distinguishing the detection coils of different groups better, the detection coils taking a side 1 as a reference side are determined as a first group of detection coils 111, and the detection coils taking a side 2 as a reference side are determined as a second group of detection coils 112. The first group of detection coils 111 is sequentially energized respectively to transmit detection signals, thereby obtaining detection results of the first group of detection coils 111. For making the detection results more accurate, the second group of detection coils 112 may further be sequentially energized respectively to transmit detection signals, thereby obtaining detection results of the second group of detection coils 112. A more accurate position region of the receiver is obtained by analysis according to the detection results of the first group of detection coils 111 and the detection results of the second group of detection coils 112.

In the embodiment, in the manner of placement based on one or more sides of multiple stacked polygons, detection may be sequentially performed by taking stacked sides as reference sides, such that the wireless charging positioning device may conveniently obtain the detection results. In addition, in the manner of grouping by taking one or more sides of the multiple stacked polygons as the reference sides, the accuracy of the determined position region of the receiver may also be conveniently improved based on detection of multiple groups of N detection coils. Furthermore, since the detection coils are deployed to be regular polygons, after the position region of the receiver is determined, a central position of the position region of the receiver may further be calculated conveniently to align the transmitting coil and the central position of the position region of the receiver.

Compared with the related art that the receiver is positioned by observation through eyes, the embodiment has the advantages that the specific detection coil covering the detection region where the receiver is located may be automatically determined through the detection signals transmitted by multiple detection coils and receiving results obtained by receiving the feedback signals, so as to further automatically determine the position region of the receiver. The position region of the receiver which is determined in such a manner is more accurate than the position region of the receiver which is determined by observation through the eyes.

Furthermore, the position region of the receiver is determined accurately, such that a relative position relationship of the receiver and the transmitting coil may be judged accurately, and relative positions may be timely adjusted, so as to finally reduce the energy loss, reduce energy consumption for wireless charging and improve the charging efficiency.

Furthermore, as mentioned above, if the receiver is in the detection region 110 covered by a presently energized detection coil 11, the detection coil 11 may receive a feedback signal of the receiver. If the receiver is not placed in the detection region 110 covered by the presently energized detection coil 11 but a feedback signal is received, the feedback signal received in such case may apparently be different from the feedback signal received when the receiver is placed in the detection region. Therefore, during the practical application, according to whether the received feedback signal meets a feedback condition, whether the feedback signal is fed back by the receiver is determined, the detection region 110 covered by the presently energized detection coil 11 is determined, and whether the receiver is in the detection region 110 covered by the presently energized detection coil 11 is finally determined, thereby determining the position region of the receiver.

In some embodiments, the processing component is further configured to: determine whether a feedback condition is met based on the feedback signal received by each detection coil; determine the detection region covered by the detection coil corresponding to a condition that the feedback condition is met; and determine the position region of the receiver according to the detection region covered by the detection coil corresponding to the condition that the feedback condition is met.

Herein, the feedback condition refers to a related condition that it may at least be judged through the feedback signal that the feedback signal is sent by the receiver based on the detection signal and is not a feedback generated by an interference signal.

Therefore, determining whether the feedback signal meets the feedback condition as a judgment basis for determining whether the receiver is in the detection region covered by the corresponding detection coil may at least eliminate interference of the feedback signal received not from the receiver. That is, the corresponding feedback signal received by the detection coil may be considered as a feedback signal fed back by the receiver only under the condition of meeting the feedback condition; otherwise, the signal is an interference signal. Therefore, the accuracy of the determined position region of the receiver is further improved.

In some implementation modes, the detection signal is a pulse signal, and the feedback signal includes a resonant signal sent in an interval between two adjacent pulses in the pulse signal. The processing component may be configured to: in response to determining that resonant energy of a resonant signal is greater than an energy threshold value and the resonant signal is a resonant signal with maximum resonant energy in the N resonant signals, determine that the feedback condition is met.

It can be understood that a charging circuit of the receiver may usually include a resonant circuit. The resonant circuit may store electric energy of a pulse signal when receiving the pulse signal sent by the transmitter, and in the interval between the two adjacent pulses in the pulse signal, namely before the transmitter sends a next pulse signal, the resonant circuit of the receiver may gradually release the electric energy stored during the previous pulse signal. Herein, the electric energy released by the resonant circuit may include the resonant energy of the resonant signal.

Furthermore, it can be understood that, when the transmitter is required to detect the position of the receiver, the detection coils sequentially send the detection signals to detect the position of the receiver.

Herein, the energy threshold value refers to a preset energy value capable of at least excluding energy brought by the interference signal. In some embodiments, the energy threshold value may be a minimum resonant energy value or an average resonant energy value capable of judging existence of the receiver in historical receiving results.

Figure 3:
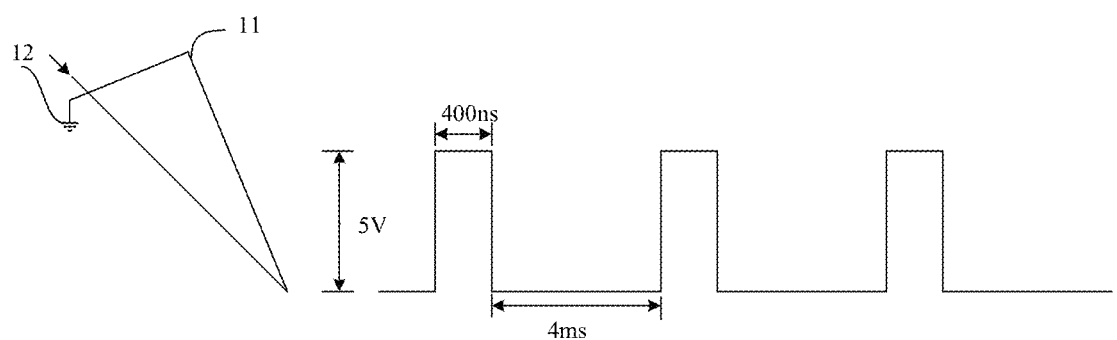
FIG. 3 is a schematic circuit diagram illustrating a detection coil, according to an example.

Referring to FIG. 3, FIG. 3 is a schematic circuit diagram illustrating a detection coil, according to an example. As illustrated in FIG. 3, there is no load on the detection coil 11, the detection coil 11 is a closed coil, and the detection coil 11 is connected with a power supply 12, such that the detection coil 11 may generate an electromagnetic field after being energized. Herein, the detection signal transmitted by the detection coil is a pulse signal, and the pulse signal refers to a high-level voltage signal externally transmitted in a time interval.

It can be understood that, when the receiver is placed in the detection region 110 covered by the presently energized detection coil 11 or nearby the detection region 110 covered by the presently energized detection coil 11, the receiver may feed back the resonant signal in the interval between two adjacent pulses in the pulse signal after receiving the pulse signal. Therefore, if the resonant energy of the resonant signal is greater than the energy threshold value, it may at least be judged that the receiver is in or nearby the detection region 110 covered by the presently energized detection coil 11.

In fact, if the electric energy released by the resonant circuit of the receiver is higher, it is indicated that the detection coil sending the pulse signal is closer to the position of the receiver.

Based on this, after each detection coil is sequentially energized, if a detected resonant signal is a resonant signal with maximum resonant energy in the N resonant signals, it may be determined that the receiver is completely or partially in the detection region 110 covered by the detection coil 11 corresponding to the resonant signal with the maximum energy. An area of the part, in the detection region 110 covered by the detection coil 11 corresponding to the resonant signal with the maximum energy, of the receiver is larger than an area of the part, in the detection region 110 covered by another detection coil 11, of the receiver. Therefore, in the embodiment, it may be determined that the receiver is in the detection region 110 covered by the detection coil 11 corresponding to the resonant signal of which the resonant energy is greater than the energy threshold value and which is the resonant signal with the maximum resonant energy in the N resonant signals.

Accordingly, in the embodiment, that the resonant energy of the resonant signal is greater than the energy threshold value is judged at first to eliminate interference of other resonant energy that may be fed back, and then the resonant signal with the maximum resonant energy in the N resonant signals is determined as a resonant signal meeting the feedback condition, thereby determining the detection region covered by the detection coil corresponding to the resonant signal with the maximum resonant energy in the N resonant signals to finally determine the position region of the receiver.

It is to be noted that, when the receiver is at a boundary of two adjacent detection coils, the detection region covered by the detection coil corresponding to a larger region occupied by the receiver may be considered as the position region of the receiver in fact.

Furthermore, for improving the accuracy of the detection result, in some other embodiments, the feedback signal includes an output voltage generated based on the detection signal. The processing component is configured to: if the output voltage reaches a voltage threshold value, determine that the feedback condition is met.

It can be understood that, when the receiver is placed in the detection region 110 covered by the presently energized detection coil 11 or nearby the detection region 110 covered by the presently energized detection coil 11, the receiver, after receiving the detection signal, may generate the output voltage based on the detection signal. Herein, the output voltage may be an output voltage generated on a receiving coil in the charging circuit of the receiver, and may also be an output voltage generated by a rectifier bridge in the charging circuit of the receiver. Under a normal condition, when the output voltage is relatively low, for example, lower than 2V, the receiver may not be charged. If the receiver is in the detection region covered by the presently energized detection coil but only a relatively small part of the receiver is in the detection region covered by the presently energized detection coil, the detected output voltage generated by the receiving coil in the charging circuit of the receiver or the detected output voltage generated by the rectifier bridge in the charging circuit of the receiver may be lower than the voltage threshold value. In such case, the detection region covered by the presently energized detection coil may not be determined as a region where the receiver is presently located. It may be indicated that the detection region covered by the detection coil corresponding to the voltage threshold value is the region where the receiver is placed only when the output voltage reaches the voltage threshold value.

In the embodiment, whether the output voltage reaches the voltage threshold value is judged to eliminate a misjudgment result when only a relatively small part of the receiver is in the detection region covered by the detection coil and the transmitting coil is in the detection region but cannot charge the receiver, such that the determined position region of the receiver is more accurate.

It is to be supplemented that the device further includes a communication module of the transmitter, connected with the detection coils and configured to send the feedback signals of the receiver to the detection coils. In some embodiments, the output voltage may be detected by the receiver, and then the output voltage detected by the receiver is sent to the communication module of the transmitter through a communication module of the receiver. In some other embodiments, the output voltage may be detected by a third-party device connected with the receiver, and then the third-party device sends the detected output voltage to the communication module of the transmitter.

It is to be supplemented that the device further includes a driving circuit, which is connected between the processing component and each detection coil and is configured to periodically supply power to the detection coils according to a first time interval.

Herein, the first time interval may include a detection signal transmitting period.

Herein, the driving circuit further includes a multi-way switch. Each path of the switch is connected with a different detection coil. The processing component is further configured to periodically control a present path in the multi-way switch to be turned off according to a second time interval and control a next path of the present path in the switch to be turned on.

Herein, the second time interval is different from the first time interval, and the second time interval may include average time required by detecting whether the receiver exists. Therefore, each detection coil may be automatically controlled for periodic detection according to the second time interval.

Of course, in some other embodiments, the processing component is further configured to, when the feedback signal is received, control the present path in the multi-way switch to be turned off and control the next path of the present path to be turned on. Therefore, detection of the detection region covered by each detection coil may be completed rapidly, and the detection efficiency may be improved.

In some implementation modes, if the feedback signal is the abovementioned resonant signal, and the processing component is further configured to: determine the resonant energy of the resonant signal.

The operation that the present path in the multi-way switch is controlled to be turned off and the next path of the present path is controlled to be turned on when the feedback signal is received includes that: when the resonant energy of the received resonant signal is greater than the energy threshold value and resonant energy, detected at a previous moment, of the resonant signal is higher than resonant energy detected at a present moment, the present path in the multi-way switch is controlled to be turned off, and the next path of the present path is controlled to be turned on.

It is to be noted that, since the resonant energy of the resonant signal may be gradually attenuated along with discharge time of the resonant circuit of the receiver, in the embodiment, it is unnecessary to continue detecting the resonant energy after the resonant energy starts to be attenuated, and if detection of the next detection coil is started at this moment, detection of the next detection coil may be started when the resonant energy of the resonant signal is yet not completely released. Therefore, time for detection of each detection coil is saved, and the detection efficiency is improved.

In some other implementation modes, if the feedback signal is the abovementioned output voltage, the present path in the multi-way switch is controlled to be turned off and the next path of the present path is controlled to be turned on when the feedback signal is received includes that:

when the output voltage is received, the present path in the multi-way switch is controlled to be turned off, and the next path of the present path is controlled to be turned on. Therefore, when the output voltage is received, the next path of the switch may be turned on, and in such a manner, the detection efficiency may also be improved.

In some other embodiments, each group of detection coils in M groups of detection coils includes N detection coils, and regions covered by at least two groups of N detection coils partially overlap, where M is a positive integer greater than or equal to 2.

The processing component is further configured to: determine an intersection region of detection regions covered by the detection coils corresponding to the condition that the feedback condition is met in the M groups of N detection coils as the position region of the receiver according to the detection regions covered by the detection coils corresponding to the condition that the feedback condition is met in each group of N detection coils.

Herein, through multiple groups of N detection coils, the area of the regions, covered by the detection coils, on the surface of the base may be larger, such that the receiver may be detected in more regions. It is to be noted that, for ensuring that the detection regions covered by the detection coils corresponding to the condition that the feedback condition is met in the multiple groups of detection coils have the intersection region, in the embodiment, the regions covered by the at least two groups of detection coils partially overlap.

In the embodiment, the detection results of the multiple groups of N detection coils are comprehensively considered, such that the obtained position region of the receiver is more accurate.

Figure 4:
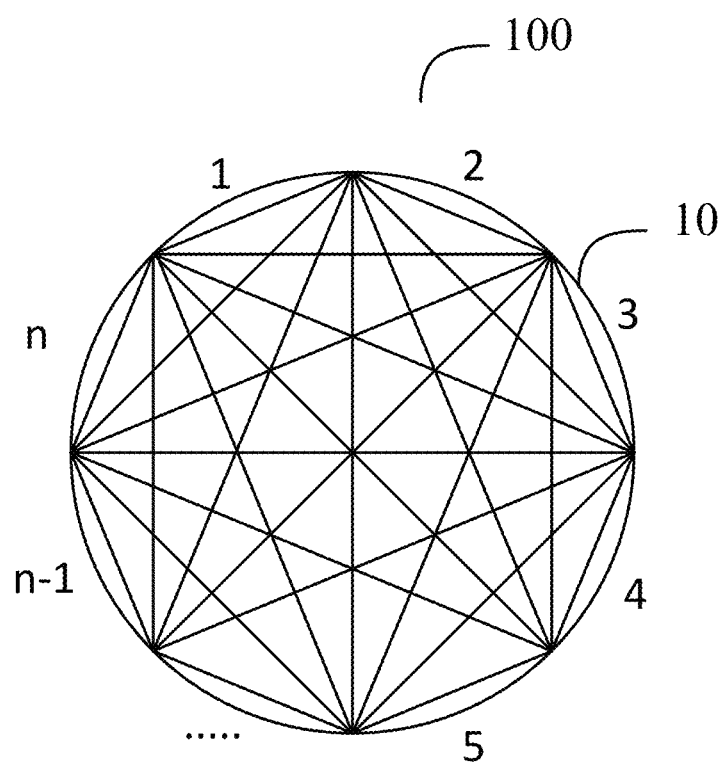
FIG. 4 is another structure diagram of a wireless charging positioning device, according to an example.

Referring to FIG. 4, FIG. 4 is another structure diagram of a wireless charging positioning device, according to an example. As illustrated in FIG. 4, the device includes M groups of detection coils, and each group of detection coils includes N detection coils.

In some embodiments, all the N detection coils have stacked parts. Herein, the detection coil is a triangle, and the stacked part is one side of the triangle. As illustrated in the figure, the stacked parts of the first group of detection coils are at a position where the side 1 is located, the stacked parts of the second group of detection coils are at a position where the side 2 is located, the stacked parts of the third group of detection coils are at a position where the side 3 is located, and so on.

Figure 5:
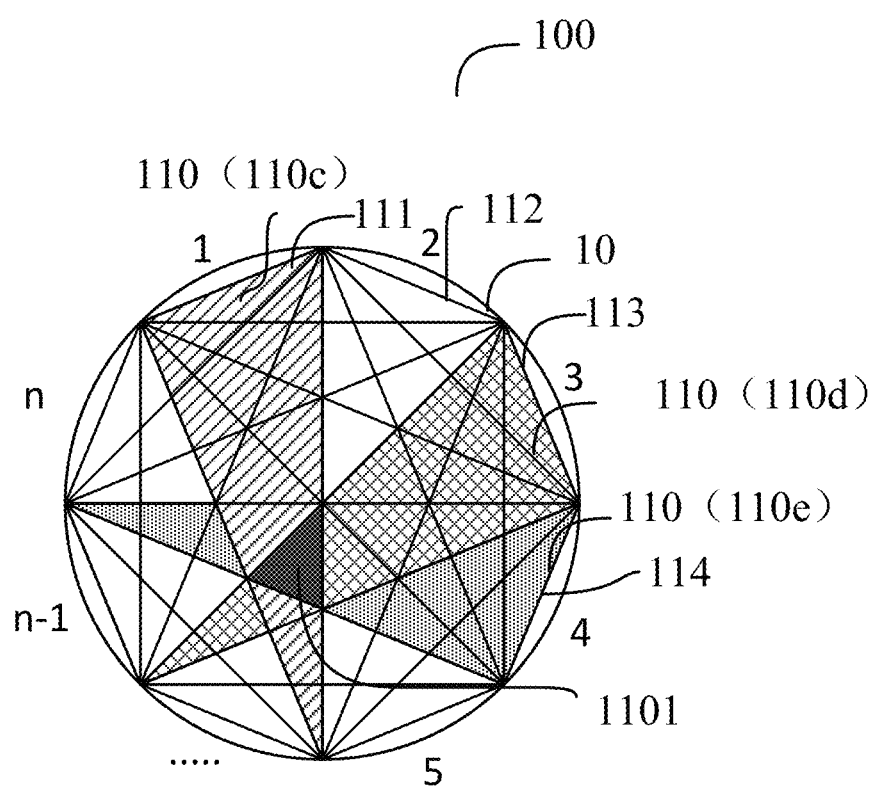
FIG. 5 is another structure diagram of a wireless charging positioning device, according to an example.

In some implementation modes, referring to FIG. 5, FIG. 5 is another structure diagram of a wireless charging positioning device, according to an example. As illustrated in FIG. 5, M is, for example, 4. After detection of the four groups of N detection coils, the specific detection coil covering the region where the receiver is located in each group of detection coils may be obtained, namely the detection region covered by the detection coil corresponding to the condition that the feedback condition is met in each group may be determined.

In some embodiments, the detection region covered by the detection coil corresponding to the condition that the feedback condition is met in the first group of detection coils 111 is a third detection region 110c; no detection coil corresponding to the condition that the feedback condition is met is detected in the second group of detection coils 112; the detection region covered by the detection coil corresponding to the condition that the feedback condition is met in the third group of detection coils 113 is a fourth detection region 110d; and the detection region covered by the detection coil corresponding to the condition that the feedback condition is met in the fourth group of detection coils 114 is a fifth detection region 110e. Therefore, an intersection region 1101 of the third detection region 110c, the fourth detection region 110d and the fifth detection region 110e may be obtained as the position region of the receiver.

Figure 6:
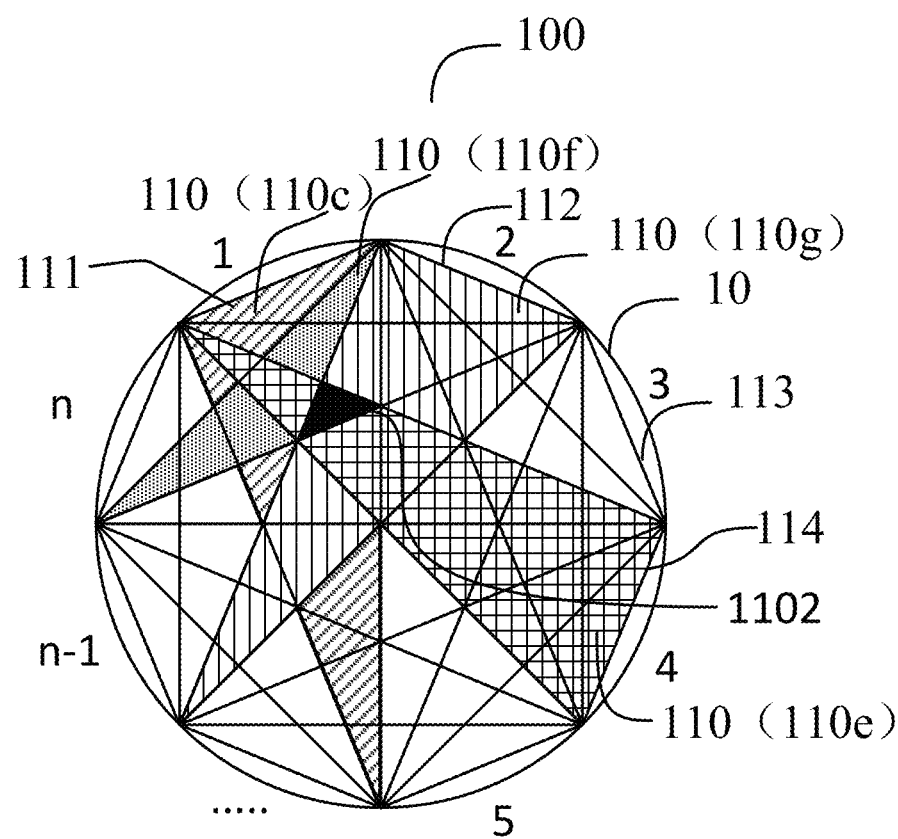
FIG. 6 is another structure diagram of a wireless charging positioning device, according to an example.

Of course, in some other implementation modes, referring to FIG. 6, FIG. 6 is another structure diagram of a receiver positioning device for wireless charging, according to an example. As illustrated in FIG. 6, M is, for example, also 4. Herein, the detection region covered by the detection region corresponding to the condition that the feedback condition is met in the first group of detection coils 111 is the third detection region 110c; the detection region covered by the detection coil corresponding to the condition that the feedback condition is met in the second group of detection coils 112 includes a sixth detection region 110f and a seventh detection region 110g; no detection coil corresponding to the condition that the feedback condition is met is detected in the third group of detection coils 113; and the detection region covered by the detection coil corresponding to the condition that the feedback condition is met in the fourth group of detection coils 114 is the fifth detection coil 110e. Therefore, an intersection region 1102 of the third detection region 110c, the fifth detection region 110e, the sixth detection region 110f and the seventh detection region 110g may be obtained as the position region of the receiver.

It is to be supplemented that, if there are more groups of N detection coils, it is indicated that a value of M is larger and the obtained detection result is more accurate, such that the position region of the receiver may be determined more accurately.

In some other embodiments, the processing component is further configured to: determine a region where a charging coil of the transmitter is located, the charging coil being configured to transmit a wireless charging signal and provide wireless electric energy for the receiver; and determine whether the position region of the receiver overlaps the region where the charging coil is located according to the position region of the receiver.

Herein, whether the position region of the receiver overlaps the region where the charging coil is located can be understood as whether respective projection regions of the receiver and the charging coil in a vertical direction overlap. When the respective projection regions of the receiver and the charging coil in the vertical direction overlap, it may be indicated that the receiver is aligned with the charging coil. When the respective projection regions of the receiver and the charging coil in the vertical direction do not overlap, it is indicated that the receiver is not aligned with the charging coil.

Herein, the position region of the receiver may be determined at first to intelligently determine whether the position region of the receiver overlaps the region where the charging coil of the transmitter. Therefore, when the position region of the receiver does not overlap the region where the charging coil is located, namely when the receiver is not aligned with the charging coil, the relative positions thereof are timely adjusted to reduce the energy loss and improve the charging efficiency.

In some embodiments, when the position region of the receiver does not overlap the region where the transmitting coil is located, prompting information is output, and the prompting information is configured to prompt the position region of the receiver to be adjusted. The user may timely adjust the position region of the receiver according to the prompting information, such that rapid reduction of the energy loss and improvement of the charging efficiency may be facilitated.

In some other embodiments, the device 100 in FIG. 1B further includes a driving component 203, and the driving component 203 is connected between the transmitter 1000 and the processing component 202 and is configured to drive the transmitter 1000 to move.

The processing component is further configured to: if the position region of the receiver does not overlap the region where the charging coil is located, send a control signal to the driving component. The control signal is configured to control the driving component to drive the transmitter to move according to the position region of the receiver, and ensure that the position region of the receiver overlaps the region where the charging coil is located.

Herein, the driving component may include a motor.

The transmitter may move along with rotation of the motor. In some embodiments, the position region of the receiver may be reported to the AP. The AP, after acquiring the position region of the receiver, sends the control signal to move the transmitter to the position region of the receiver, such that the receiver may be aligned with the transmitter. Therefore, automatic alignment of the transmitter and the receiver is implemented to reduce the energy loss of the charging coil and improve the charging efficiency.

In the embodiment, the processing component sends the control signal to control the driving component to drive the transmitter to move, so as to ensure that the position region of the receiver overlaps the region where the charging coil is located to automatically align the receiver and the transmitter, thereby reducing the energy loss of the charging coil and improving the charging efficiency. The position of the receiver is automatically adjusted, such that the alignment accuracy and alignment speed of the transmitter and the receiver are improved. Furthermore, in the embodiment, at the same time of implementing automatic and rapid alignment, the transmitter is driven to move by the driving component on the transmitter, and the receiver is not required to be structurally improved, such that increase of the cost of the receiver is avoided, any receiver may be positioned and aligned automatically and rapidly on the transmitter, the charging efficiency is improved, and meanwhile, the universality of the transmitter is also improved.

Furthermore, for further reducing the energy loss of the charging coil and improving the charging efficiency, in some embodiments, the processing component is further configured to: determine a central position of the position region of the receiver. The control signal is configured to control the driving component to drive the transmitter to move, and ensure that the region where the charging coil is located overlaps the central position of the position region of the receiver.

Herein, for determination of the central position of the position region of the receiver, the central position of the position region of the receiver may be calculated based on an interpolation algorithm or a Newton iteration algorithm, etc., after the position region of the receiver is determined.

In the embodiment, the driving component may be controlled through the control signal to drive the transmitter to move to ensure that the charging coil overlaps the central position of the position region of the receiver, such that the transmitter may be completely aligned with the central position of the receiver, the energy loss is further reduced, and the charging efficiency is further improved.

It is to be supplemented that a first cross sectional diameter of the detection coil is shorter than a second cross sectional diameter of the charging coil.

Since the charging coil of the transmitter is mainly configured to transmit charging power and is required to bear a high current, the cross sectional diameter of the charging coil of the transmitter is usually 2-3 mm. On the other hand, since the detection coil is not required to charge the receiver and is not required to bear a high current, a relatively thin electric wire may be used, and it is usually required to be a few tenths of a millimeter only.

Therefore, using a coil with a relatively small cross sectional diameter as the detection coil may reduce the cost on one hand; and on the other hand, as mentioned above, such a coil may not bear a relatively high current and thus may not consume excessive electric energy, and the electric energy provided by the detection coil is used for detection only.

Furthermore, the present disclosure also provides a specific embodiment to further understand the wireless charging positioning device provided in the embodiments of the present disclosure.

Herein, the receiver is, for example, a mobile phone.

In the related art, a user places a mobile phone on a base of a wireless charging transmitter for wireless charging, and central positions of a receiving coil of the mobile phone and a charging coil may inevitably be deviated, thereby resulting in low charging efficiency and serious energy loss. At present, many manufacturers have produced mobile phones supporting wireless charging to bring convenience to wireless charging for users, but the mobile phones are all manually placed on wireless charging bases and then the mobile phones are manually moved to centers of the bases of transmitters, i.e., positions where charging coils are located, through eyes. At present, there is no effective measure for helping a user to detect a position of a receiver on a base and helping the user to determine whether the receiver is aligned with a transmitter.

Therefore, it is necessary to provide a technical solution through which a position of a receiver may be automatically determined and an alignment operation over the receiver and a transmitter may further be executed based on the position of the receiver, so as to enlarge a charging area during wireless charging and improve the charging efficiency.

Herein, referring to FIG. 4, in the embodiment, the wireless charging positioning device includes N detection coils, each detection coil may be a triangle-shape coil, and each triangle-shape detection coil is independent of one another. Furthermore, the detection coils of each group are stacked on one side, such that each detection coil may be sequentially energized by taking the stacked sides as reference sides to detect the position of the receiver. It is to be supplemented that the N detection coils are deployed below a base 10 of the transmitter.

In some embodiments, the detection coils transmit detection signals and receive feedback signals, thereby determining detection regions covered by the detection coils corresponding to the condition that a feedback condition is met to finally determine the specific detection coil covering the detection region where the receiver is located in the group of detection coils.

Herein, referring to FIG. 3, the detection signal may be a pulse signal, and the feedback signal may be a detected resonant signal fed back by the receiver in an interval of two adjacent pulses in the pulse signal. It is determined according to that resonant energy of the resonant signal is greater than an energy threshold value and the resonant signal is a resonant signal with maximum resonant energy in the N resonant signals that the feedback condition is met, thereby determining a position region of the receiver.

Of course, in some other implementation modes, the feedback signal may also be a received output voltage generated by the receiver based on the detection signal; and if the output voltage reaches a voltage threshold value, it is determined that the feedback condition is met, thereby determining the position region of the receiver.

Furthermore, for further improving the accuracy of the determined position region of the receiver, in some other embodiments, referring to FIGS. 4-6, M groups of detection coils are deployed below the base 10, and each group of detection coils includes N detection coils.

At first, the first group of detection coils 111 is sequentially energized by taking the side 1 as a reference side, thereby detecting the detection region covered by the detection coil corresponding to the condition that the feedback condition is met in the first group of detection coils 111. Then, the second group of detection coils 112 are sequentially energized by taking the side 2 as a reference side, thereby detecting the detection region covered by the detection coil corresponding to the condition that the feedback condition is met in the second group of detection coils 112, and so on. Finally, an intersection region of the detection regions covered by the detection coils corresponding to the condition that the feedback condition is met in each group is determined as the position region of the receiver according to the detection regions covered by the detection coils corresponding to the condition that the feedback condition is met in each group.

It is to be noted that the position region of the receiver may usually be determined relatively accurately by detection of four groups of N detection coils. Of course, for determining the position region of the receiver more accurately, more groups of N detection coils may be detected.

Furthermore, the processing component may further be configured to determine a region where a charging coil of the transmitter is located. The charging coil is configured to transmit a wireless charging signal to provide wireless electric energy for the receiver, and determine whether the position region of the receiver overlaps the region where the charging coil is located according to the position region of the receiver. Therefore, whether the receiver is aligned with the transmitter is automatically judged.

Furthermore, the device further includes a driving component, and the driving component is connected between the transmitter and the processing component and is configured to drive the transmitter to move.

In the embodiment, after the position region of the receiver is determined, the determined position region of the receiver may be reported to the AP, and the AP sends a control signal to the driving component after acquiring the position region of the receiver. The transmitter may be driven by the control signal to move, so as to ensure that the region where the charging coil is located overlaps the position region of the receiver. Therefore, the technical effect of automatically aligning the receiver and the transmitter to improve the charging efficiency is achieved.

Of course, for further improving the charging efficiency, after the position region of the receiver is determined, a central position of the position region of the receiver may further be determined, and then the transmitter is driven to move, so as to ensure that the region where the charging coil overlaps the central position of the position region of the receiver, such that the receiver may be completely aligned with the transmitter to further reduce the energy loss and further improve the charging efficiency.

In the embodiment, the M groups of detection coils are deployed below a surface of the base, and each group of detection coils includes N detection coils, so as to rapidly determine the position region of the receiver. The transmitter is driven by the control signal sent by the driving component to move, so as to ensure that the region where the charging coil is located overlaps the central position of the position region of the receiver, such that the receiver may be aligned with the transmitter automatically and rapidly, the energy loss is reduced, and the charging efficiency is improved. In addition, the receiver is not required to be structurally improved, such that the transmitter may wirelessly charge any receiver, and the universality of the transmitter is improved.

Figure 7:
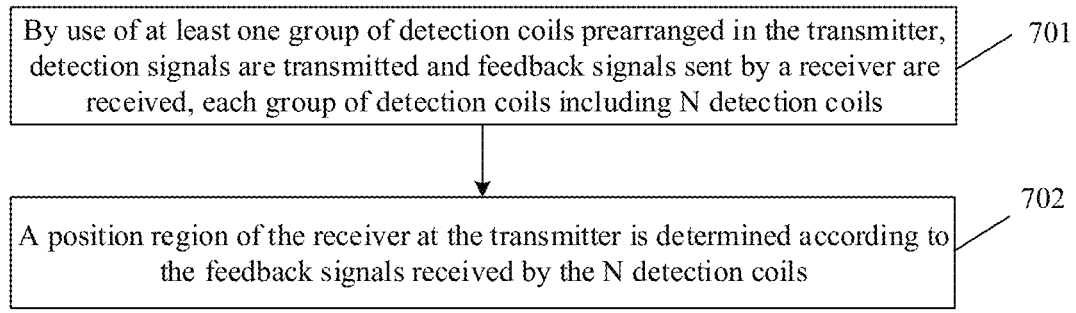
FIG. 7 is a flow chart showing a wireless charging positioning method, according to an example.

FIG. 7 is a flow chart showing a wireless charging positioning method, according to an example. As illustrated in FIG. 7, the method is applied to the abovementioned transmitter and includes operations as follows.

At 701, by use of at least one group of detection coils prearranged in the transmitter, detection signals are transmitted, and feedback signals sent by a receiver are received, each group of detection coils including N detection coils, N being a positive integer greater than or equal to 2 and detection regions covered by different detection coils being at least partially different.

At 702, a position region of the receiver at the transmitter is determined according to the feedback signals received by the N detection coils.

Compared with the related art that the receiver is positioned by observation through eyes, the embodiment has the advantages that the specific detection coil covering the detection region where the receiver is located may be automatically determined through the detection signals transmitted by multiple detection coils and the received feedback signals to further automatically determine the position region of the receiver. The position region of the receiver which is determined in such a manner is more accurate than the position region of the receiver which is determined by observation through the eyes.

Figure 8:
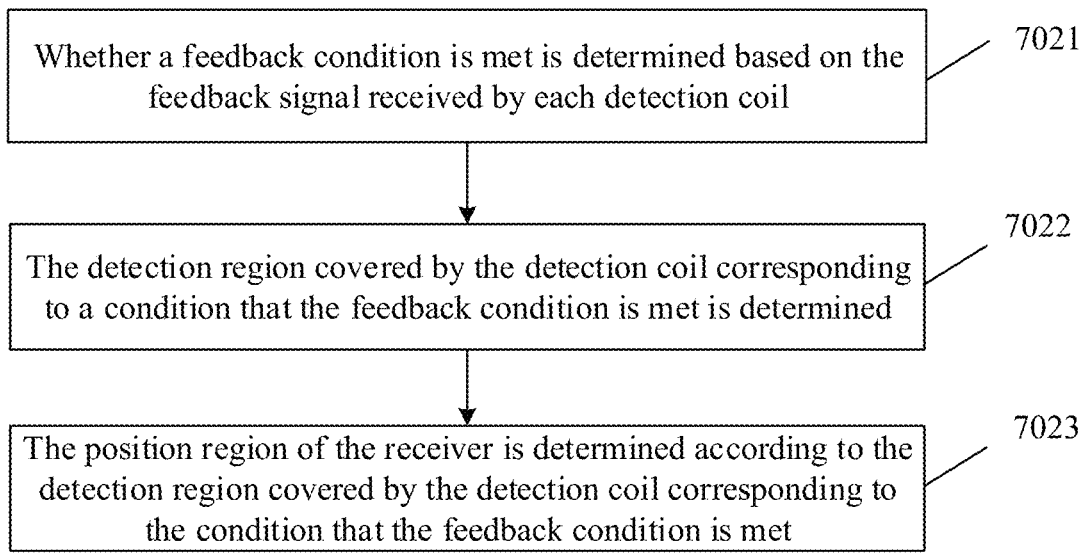
FIG. 8 is another flow chart showing a wireless charging positioning method, according to an example.

In an optional embodiment, referring to FIG. 8, FIG. 8 is another flow chart showing a receiver positioning method for wireless charging, according to an example. As illustrated in FIG. 8, the operation 702, i.e., the operation that the position region of the receiver at the transmitter is determined according to the feedback signals received by the N detection coils includes operations as follows.

At 7021, whether a feedback condition is met is determined based on the corresponding feedback signal received by each detection coil.

At 7022, the detection region covered by the detection coil corresponding to a condition that the feedback condition is met is determined.

At 7023, the position region of the receiver is determined according to the detection region covered by the detection coil corresponding to the condition that the feedback condition is met.

In the embodiment, determining whether the feedback signal meets the feedback condition as a judgment basis for determining whether the receiver is in the detection region covered by the corresponding detection coil may at least eliminate interference of the feedback signal received not from the receiver. That is, the corresponding feedback signal received by the detection coil may be considered as a feedback signal fed back by the receiver only under the condition of meeting the feedback condition; otherwise, the signal is an interference signal. Therefore, the detection accuracy of the position region of the receiver is further improved.

In an optional embodiment, the detection signal is a pulse signal, and the feedback signal includes a resonant signal fed back in an interval between two adjacent pulses in the pulse signal. The method further includes that: if resonant energy of a resonant signal is greater than an energy threshold value and the resonant signal is a resonant signal with maximum resonant energy in the N resonant signals, it is determined that the feedback condition is met.

In an optional embodiment, the feedback signal includes an output voltage generated based on the detection signal; and the method further includes that: if the output voltage reaches a voltage threshold value, it is determined that the feedback condition is met.

In an optional embodiment, if there are M groups of detection coils, each group of detection coils includes N detection coils, and regions covered by at least two groups of N detection coils partially overlap. M is a positive integer greater than or equal to 2.

The operation that the position region of the receiver is determined according to the detection region covered by the detection coil corresponding to the condition that the feedback condition is met includes that: an intersection region of detection regions covered by the detection coils corresponding to the condition that the feedback condition is met in the M groups of N detection coils is determined as the position region of the receiver according to the detection regions covered by the detection coils corresponding to the condition that the feedback condition is met in each group of N detection coils.

In the embodiment, the detection results of the multiple groups of N detection coils are comprehensively considered, such that the obtained position region of the receiver is more accurate.

In an optional embodiment, the method further includes that: a region where a charging coil of the transmitter is located is determined, and the charging coil is configured to transmit a wireless charging signal to provide wireless electric energy for the receiver; and whether the position region of the receiver overlaps the region where the charging coil is located is determined according to the position region of the receiver.

In the embodiment, the position region of the receiver is determined accurately, such that a relative position relationship of the receiver and the charging coil may be judged accurately and relative positions of the receiver and the transmitter may be timely adjusted to finally reduce the energy loss, thereby reducing energy consumption for wireless charging and improving the charging efficiency.

In an optional embodiment, the method further includes that: if the receiver does not overlap the region where the charging coil is located, a control signal is sent to drive the transmitter to move, so as to ensure that the position region of the receiver overlaps the region where the charging coil is located.

In the embodiment, the processing component sends the control signal to control the driving component to drive the transmitter to move, so as to ensure that the position region of the receiver overlaps the region where the charging coil is located to automatically align the receiver and the transmitter, thereby reducing the energy loss of the transmitter and improving the charging efficiency. The position of the receiver is automatically adjusted, such that the alignment accuracy and alignment speed of the transmitter and the receiver are improved. Furthermore, in the embodiment, at the same time of implementing automatic and rapid alignment, the transmitter is moved by the driving component connected with the transmitter, and the receiver is not required to be structurally improved, such that increase of the cost of the receiver is avoided, any receiver may be positioned and aligned automatically and rapidly on the transmitter, the charging efficiency is improved, and meanwhile, the universality of the transmitter is also improved.

In an optional embodiment, the method further includes that: a central position of the position region of the receiver is determined; and the operation that the control signal is sent to drive the transmitter to move includes that: the control signal is sent to drive the transmitter to move, so as to ensure that the region where the charging coil is located overlaps the central position of the position region of the receiver.

In the embodiment, the driving component may be controlled through the control signal to drive the transmitter to move to the central position of the position region of the receiver, such that the transmitter may be completely aligned with the central position of the receiver, the energy loss is further reduced, and the charging efficiency is further improved.

With respect to the method in the above embodiment, specific modes have been described in detail in the embodiment regarding the receiver positioning device for wireless charging, which will not be elaborated herein.

Figure 9:
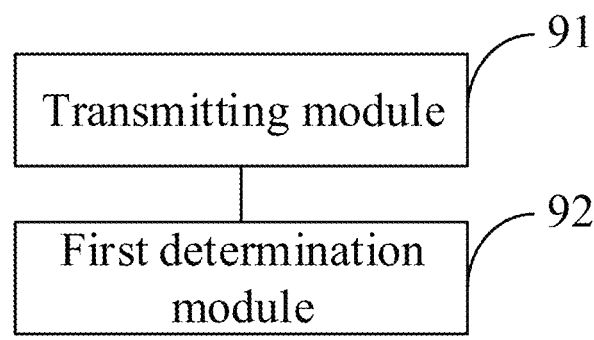
FIG. 9 is a block diagram of a wireless charging positioning device, according to an example.

FIG. 9 is a block diagram of a wireless charging positioning device, according to an example. Referring to FIG. 9, the device includes a transmitting module 91 and a first determination module 92.

The transmitting module 91 is configured to, by use of at least one group of detection coils prearranged in a transmitter, transmit detection signals and receive feedback signals sent by a receiver, each group of detection coils including N detection coils, N being a positive integer greater than or equal to 2 and detection regions covered by different detection coils being at least partially different.

The first determination module 92 is configured to determine a position region of the receiver at the transmitter according to the feedback signals received by the N detection coils.

In some optional embodiments, the first determination module 92 is configured to: determine whether a feedback condition is met based on the feedback signal received by each detection coil; determine the detection region covered by the detection coil corresponding to a condition that the feedback condition is met; and determine the position region of the receiver according to the detection region covered by the detection coil corresponding to the condition that the feedback condition is met.

In some optional embodiments, the detection signal is a pulse signal, and the feedback signal includes a resonant signal sent in an interval between two adjacent pulses in the pulse signal; and the device further comprises: a second determination module, configured to, if resonant energy of a resonant signal is greater than an energy threshold value and the resonant signal is a resonant signal with maximum resonant energy in the N resonant signals, determine that the feedback condition is met.

In some optional embodiments, the feedback signal includes an output voltage generated based on the detection signal; and the device further comprises: a third determination module, configured to, if the output voltage reaches a voltage threshold value, determine that the feedback condition is met.

In some optional embodiments, if there are M groups of detection coils, each group of detection coils includes N detection coils, and regions covered by at least two groups of N detection coils partially overlap. M is a positive integer greater than or equal to 2.

The first determination module is further configured to: determine an intersection region of detection regions covered by the detection coils corresponding to the condition that the feedback condition is met in the M groups of N detection coils as the position region of the receiver according to the detection regions covered by the detection coils corresponding to the condition that the feedback condition is met in each group of N detection coils.

In some optional embodiments, the device further includes: a fourth determination module, configured to determine a region where a charging coil of the transmitter is located, the charging coil being configured to transmit a wireless charging signal to provide wireless electric energy for the receiver, and determine whether the position region of the receiver overlaps the region where the charging coil is located according to the position region of the receiver.

In some optional embodiments, the device further includes: a sending module, configured to, if the position region of the receiver does not overlap the region where the charging coil is located, send a control signal to drive the transmitter to move, and ensure that the position region of the receiver overlaps the region where the charging coil is located.

In some optional embodiments, the device further includes: a fifth determination module, configured to determine a central position of the position region of the receiver; and the sending module is further configured to: send the control signal to drive the transmitter to move, and ensure that the region where the charging coil is located overlaps the central position of the position region of the receiver.

With respect to the device in the above embodiment, specific modes of the operations executed by each module therein have been described in detail in the embodiment regarding the receiver positioning device for wireless charging, which will not be elaborated herein.

Figure 10:
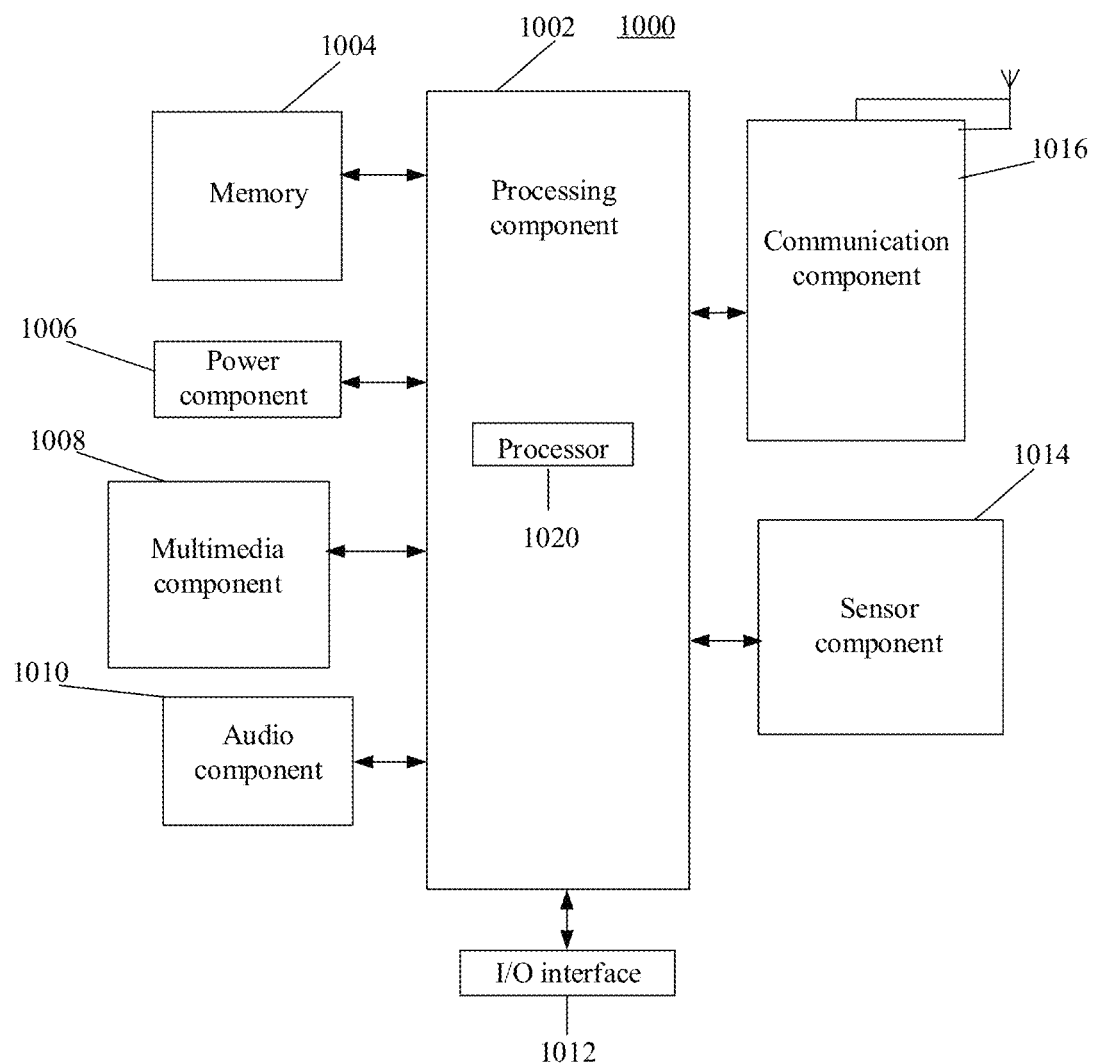
FIG. 10 is a block diagram of a transmitter, according to an example.

FIG. 10 is a block diagram of a transmitter 1000, according to an example. The transmitter 1000 is provided with the abovementioned wireless charging positioning device. For example, the transmitter 1000 may be a mobile phone, a computer, a digital broadcast transmitter, a messaging device, a gaming console, a tablet, a medical device, exercise equipment, a personal digital assistant, and the like.

Referring to FIG. 10, the transmitter 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the transmitter 1000, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and other components. For instance, the processing component 1002 may include a multimedia module to facilitate interaction between the multimedia component 1008 and the processing component 1002.

The memory 1004 is configured to store various types of data to support the operation of the transmitter 1000. Examples of such data include instructions for any applications or methods operated on the transmitter 1000, contact data, phonebook data, messages, pictures, video, etc. The memory 1004 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1006 provides power for various components of the transmitter 1000. The power component 1006 may include a power management system, one or more power supplies, and other components associated with generation, management and distribution of power for the transmitter 1000.

The multimedia component 1008 includes a screen providing an output interface between the transmitter 1000 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1008 includes a front camera and/or a rear camera. The front camera and/or the rear camera may receive external multimedia data when the transmitter 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a microphone (MIC), and the MIC is configured to receive an external audio signal when the transmitter 1000 is in an operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and peripheral interface modules, such as a keyboard, a click wheel, buttons and the like. The buttons may include, but are not limited to: a home button, a volume button, a starting button and a locking button.

The sensor component 1014 includes one or more sensors configured to provide status assessments in various aspects for the transmitter 1000. For instance, the sensor component 1014 may detect an on/off status of the transmitter 1000 and relative positioning of components, such as a display and small keyboard of the transmitter 1000, and the sensor component 1014 may further detect a change in a position of the transmitter 1000 or a component of the transmitter 1000, presence or absence of contact between the user and the transmitter 1000, orientation or acceleration/deceleration of the transmitter 1000 and a change in temperature of the transmitter 1000. The sensor component 1014 may include a proximity sensor configured to detect presence of an object nearby without any physical contact. The sensor component

1014 may also include a light sensor, such as a complementary metal oxide semiconductor (CMOS) or charge coupled device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the transmitter 1000 and other devices. The transmitter 1000 may access a communication-standard-based wireless network, such as a wireless fidelity (WiFi) network, a 4th-generation (4G) or 5th-generation (5G) network or a combination thereof. In an example, the communication component 1016 receives a broadcast signal or broadcast associated information from an external broadcast management system through a broadcast channel. In an example, the communication component 616 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an example, the transmitter 1000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an example, there is also provided anon-transitory computer-readable storage medium including instructions, such as included in the memory 1004, executable by the processor 1020 of the transmitter 1000 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

According to a non-transitory computer-readable storage medium, instructions in the storage medium are executed by a processor of a transmitter to cause the transmitter to execute the wireless charging positioning method of each abovementioned embodiment.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A wireless charging positioning device, applied to a transmitter, comprising: a group of detection coils comprising N detection coils respectively covering N detection regions that are at least partially different, each detection coil configured to transmit a detection signal and receive a feedback signal sent by a receiver, and N being a positive integer greater than or equal to 2; and at least one processor, connected with the N detection coils and configured to determine a position region of the receiver at the transmitter according to the feedback signals received by the N detection coils, wherein the detection signal transmitted by the detection coil is a pulse signal, and the pulse signal refers to a high-level voltage signal externally transmitted in a time interval; wherein the feedback signal is a detected and received resonant signal fed back by the receiver in an interval of two adjacent pulses in the pulse signals, wherein the at least one processor is further configured to: determine whether a feedback condition is met based on the feedback signal received by each detection coil; determine the detection region covered by the detection coil corresponding to a condition that the feedback condition is met; and determine the position region of the receiver according to the detection region covered by the detection coil corresponding to the condition that the feedback condition is met, wherein the feedback condition refers to a related condition of determining through the feedback signal that the feedback signal is sent by the receiver based on the detection signal and is not a feedback generated by an interference signal.

2. The device of claim 1, wherein at least two detection coils are partially stacked.

3. The device of claim 2, wherein the detection coil is in a shape of a polygon, and a stacked part of the at least two detection coils comprises a side of the polygon.

4. The device of claim 1, wherein regions covered by at least two groups of N detection coils in M groups of detection coils partially overlap, and M is a positive integer greater than or equal to 2; wherein the at least one processor is further configured to: determine an intersection region of detection regions covered by the detection coils corresponding to the condition that the feedback condition is met in the M groups of N detection coils as the position region of the receiver according to the detection regions covered by the detection coils corresponding to the condition that the feedback condition is met in each group of N detection coils.

5. The device of claim 1, wherein the N detection coils are in a preset range of a base of the transmitter; wherein the base is configured to bear the receiver.

6. The device of claim 5, wherein the at least one processor is further configured to:
determine a region where a charging coil of the transmitter is located, the charging coil being configured to transmit a wireless charging signal and provide wireless electric energy for the receiver; and
determine whether the position region of the receiver overlaps the region where the charging coil is located according to the position region of the receiver;
wherein the detection coil and the charging coil are on different horizontal planes, and the detection coil and the charging coil are separated.

7. The device of claim 6, further comprising a driving component, connected between the transmitter and the at least one processor and configured to drive the transmitter to move;
wherein the at least one processor is further configured to:
send, responsive to that the position region of the receiver does not overlap the region where the charging coil is located, a control signal to the driving component; the control signal being configured to control the driving component to drive the transmitter to move according to the position region of the receiver, and ensure that the position region of the receiver overlaps the region where the charging coil is located.

8. The device of claim 7, wherein the at least one processor is further configured to: determine a central position of the position region of the receiver;
wherein the control signal is configured to control the driving component to drive the transmitter to move, and ensure that the region where the charging coil is located overlaps the central position of the position region of the receiver.

9. The device of claim 6, wherein a first cross sectional diameter of the detection coil is shorter than a second cross sectional diameter of the charging coil.

10. A wireless charging positioning method, applied to a transmitter, comprising: transmitting, by use of at least one group of detection coils prearranged in the transmitter, detection signals and receiving feedback signals sent by a receiver, the at least one group of detection coils comprising N detection coils, N being a positive integer greater than or equal to 2, wherein detection regions covered by different detection coils are at least partially different; and determining a position region of the receiver at the transmitter according to the feedback signals received by the N detection coils; wherein the detection signal transmitted by the detection coil is a pulse signal, and the pulse signal refers to a high-level voltage signal externally transmitted in a time interval; wherein the feedback signal is a detected and received resonant signal fed back by the receiver in an interval of two adjacent pulses in the pulse signals,
wherein determining the position region of the receiver at the transmitter according to the feedback signals received by the N detection coils comprises:
determining whether a feedback condition is met based on the feedback signal received by each detection coil;
determining the detection region covered by the detection coil corresponding to a condition that the feedback condition is met; and
determining the position region of the receiver according to the detection region covered by the detection coil corresponding to the condition that the feedback condition is met, wherein the feedback condition refers to a related condition of determining through the feedback signal that the feedback signal is sent by the receiver based on the detection signal and is not a feedback generated by an interference signal.

11. The method of claim 10, wherein the detection signal is a pulse signal, and the feedback signal comprises a resonant signal sent in an interval between two adjacent pulses in the pulse signal; wherein the method further comprises: determining,
responsive to that resonant energy of a resonant signal is greater than an energy threshold value and the resonant signal is a resonant signal with maximum resonant energy in the N resonant signals, that the feedback condition is met.

12. The method of claim 10, wherein the feedback signal comprises an output voltage generated based on the detection signal; wherein the method further comprises: determining, responsive to that the output voltage reaches a voltage threshold value, that the feedback condition is met.

13. The method of claim 10, wherein, responsive to that there are M groups of detection coils, each group of detection coils comprises N detection coils, regions covered by at least two groups of N detection coils partially overlap, and M is a positive integer greater than or equal to 2; and
wherein determining the position region of the receiver according to the detection region covered by the detection coil corresponding to the condition that the feedback condition is met comprises:
determining an intersection region of detection regions covered by the detection coils corresponding to the condition that the feedback condition is met in the M groups of N detection coils as the position region of the receiver according to the detection regions covered by the detection coils corresponding to the condition that the feedback condition is met in each group of N detection coils.

14. The method of claim 10, further comprising:
determining a region where a charging coil of the transmitter is located, the charging coil being configured to transmit a wireless charging signal and provide wireless electric energy for the receiver; and
determining whether the position region of the receiver overlaps the region where the charging coil is located according to the position region of the receiver.

15. The method of claim 14, further comprising:
sending, responsive to that the position region of the receiver does not overlap the region where the charging coil is located, a control signal to drive the transmitter to move, and ensuring that the position region of the receiver overlaps the region where the charging coil is located.

16. The method of claim 15, further comprising: determining a central position of the position region of the receiver;
wherein sending the control signal to drive the transmitter to move comprises:
sending the control signal to drive the transmitter to move, and ensuring that the region where the charging coil is located overlaps the central position of the position region of the receiver.

17. A non-transitory computer-readable storage medium, in which a computer program is stored, the program being executed by a processor to implement a wireless charging positioning method applied to a transmitter, comprising:
transmitting, by use of at least one group of detection coils prearranged in the transmitter, detection signals and receiving feedback signals sent by a receiver, the at least one group of detection coils comprising N detection coils, N being a positive integer greater than or equal to 2, wherein detection regions covered by different detection coils are at least partially different; and determining a position region of the receiver at the transmitter according to the feedback signals received by the N detection coils;

wherein the detection signal transmitted by the detection coil is a pulse signal, and the pulse signal refers to a high-level voltage signal externally transmitted in a time interval;

wherein the feedback signal is a detected and received resonant signal fed back by the receiver in an interval of two adjacent pulses in the pulse signals;

wherein determining the position region of the receiver at the transmitter according to the feedback signals received by the N detection coils comprises:

determining whether a feedback condition is met based on the feedback signal received by each detection coil;

determining the detection region covered by the detection coil corresponding to a condition that the feedback condition is met; and determining the position region of the receiver according to the detection region covered by the detection coil corresponding to the condition that the feedback condition is met wherein the feedback condition refers to a related condition of determining through the feedback signal that the feedback signal is sent by the receiver based on the detection signal and is not a feedback generated by an interference signal.

* * * * *